United States Patent Office 2,770,829
Patented Nov. 20, 1956

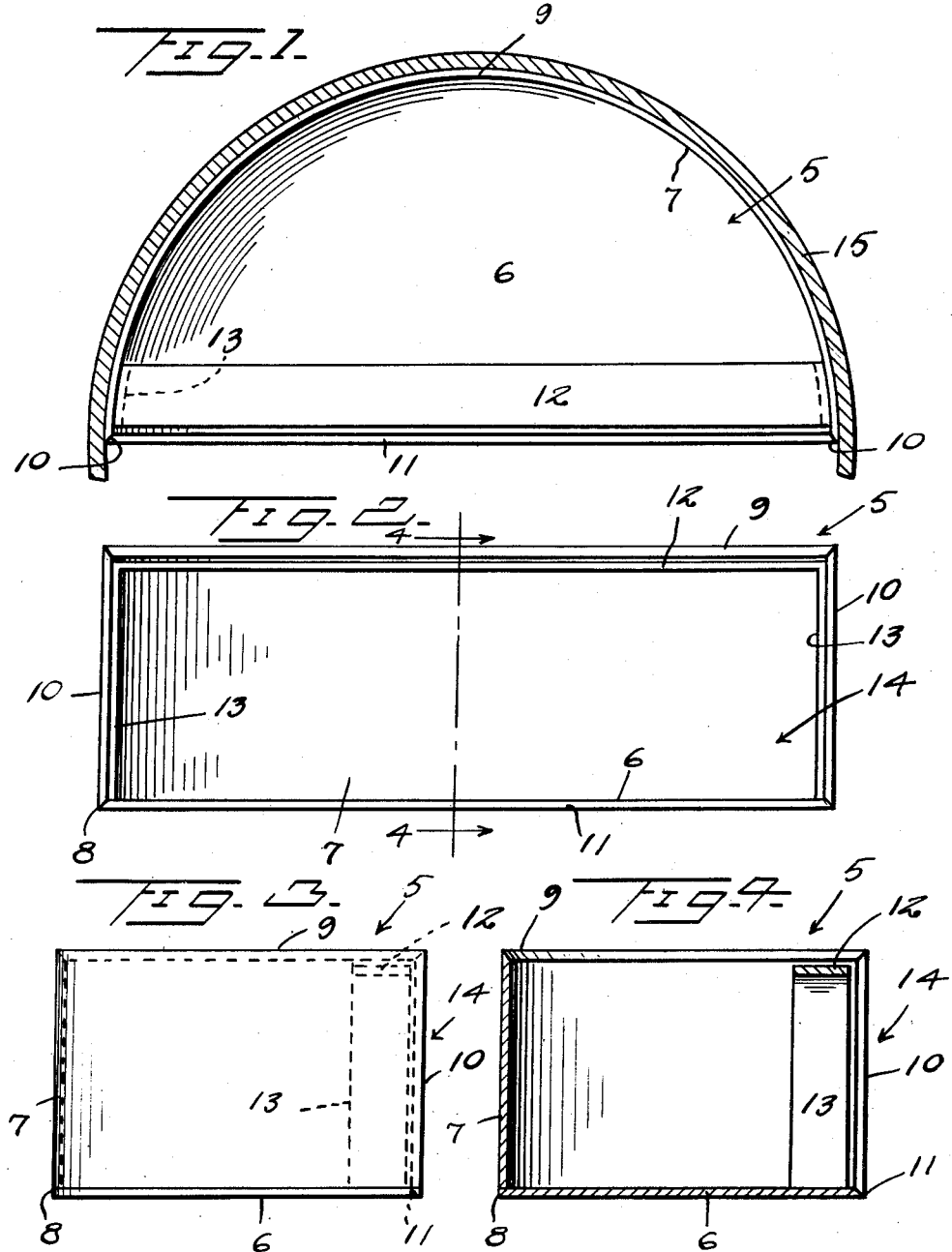

2,770,829

SCRAPER

Holly L. Williams, Warrenville, S. C.

Application March 15, 1954, Serial No. 416,250

2 Claims. (Cl. 15—236)

This invention relates to a novel scraper of extremely simple construction which is particularly adapted for scraping the interior of a pipe or a flat surface and which can effectively function for scraping corners.

Another object of the invention is to provide a scraper having a multiplicity of scraping edges capable of functioning individually or in combination for accomplishing numerous scraping operations.

Another object of the invention is to provide a scraper which additionally provides a scoop for scooping up the material either after or during the scraping operation.

Various other objects and advantages of the invention will hereinafter become more fully apparent from the following description of the drawing, illustrating a presently preferred embodiment thereof, and wherein:

Figure 1 is a plan view of the scraper shown in a position to scrape one half of a pipe of circular cross section;

Figure 2 is a front elevational view of the scraper;

Figure 3 is a side elevational view thereof looking from left to right of Figure 2, and Figure 4 is a sectional view taken substantially along a plane as indicated by the line 4—4 of Figure 2.

Referring more specifically to the drawing, the scraper in its entirety and comprising the invention is designated generally 5 and comprises a substantially flat bottom 6 which is substantially semicircular and a semicylindrical or semi-annual wall 7. The wall 7 rises substantially perpendicularly from and is substantially coextensive with the arcuate edge 8 of the bottom 6. Said wall 7 may be formed integral with or suitably joined to the bottom 6. The parts 6 and 7 are preferably formed of sheet metal. The upper semi-annular edge of the wall 7 is beveled preferably on its inner side to provide a semi-annular scraping edge 9 and the ends of the wall 7 are similarly beveled to form corresponding scraping edges 10. The straight front edge of the bottom 6 is likewise beveled on its inner side to form a scraping edge 11 which is disposed in the same plane as the scraping edges 10 and which combines therewith to form the open front of the scraper 5, designated generally 14. It will also be noted that the lower ends of the side scraping edges 10 merge at their upper ends with the ends of the top scraping edge 9 and at their lower ends with the ends of the bottom front scraping edge 11.

The scraper 5 also includes a crossbar 12 which extends between remote portions of the wall 7 and which is joined thereto beneath and adjacent the end portions of the top scraping edge 9 and near to but spaced from portions of the side edges 10. The bar 12 has downturned ends 13 which are disposed against and suitably secured to the inner side of the wall 7 and which are spaced from the side scraping edges 10, as seen in Figure 4. The crossbar 12 provides a brace for the upper and end portions of the wall 7 and may be formed of a heavier material than said wall and the bottom 6.

If bottom 6 and the wall 7 are formed of a relatively light gauge sheet metal, the beveling of the edges thereof to form the scraping edges 9, 10 and 11 may be dispensed with.

Various portions of the scraper 5 may be utilized to provide a handhold depending upon how the scraper is being used. For example, the crossbar 12 may be grasped as a handle or may be grasped in combination with the bottom 6 with either hand for moving the scraper through a pipe and with the edge 9 constituting the leading scraping edge, for scraping one half of the internal surface of a pipe 15, as illustrated in Figure 1. Thereafter, the other half of the interior of the pipe may be scraped by turning the scraper 5 in a half circle in either direction. This may be accomplished by either a pulling or a pushing force. If the upper half of the pipe 15 is first scraped, the scrapings therefrom and from the lower half will be picked up by the scraper simultaneously with the scraping of the lower half, so that the scraper 5 also forms a scoop.

For scraping the interior of an enclosure, such as a fuel oil burning chamber, for example, the bottom front edge 11 may be employed as a scraping edge for the bottom of such chamber, not shown, and either the edge 11 or one of the edges 10 may be used for scraping the interior of the side and end walls of the chamber. For such operations, the crossbar 12 may be employed as a handle or may be grasped in combination with the outer side of the intermediate portion of the wall 7. Likewise, merging ends of the edges 9 and 10 or 10 and 11 may be effectively used for scraping corners or in narrow spaces as between grates.

The scraping edges 9, 10 and 11 are not sufficiently sharp to cut the hand employed to hold the scraper and scoop 5 and, as previously stated, if the material of which the bottom 6 and wall 7 are formed is sufficiently thin these edges may be left blunt and the beveling thereof dispensed with.

Obviously, the scraper and scoop 5 may be made of different sizes; however, the scraper and scoop as illustrated are approximately of a preferred actual size for use with pipes having six inch internal diameters, so that the scraper 5 is approximately six inches wide across its open front 14.

Various modifications and changes are contemplated and may obviously be resorted to, without departing from the spirit or scope of the invention as hereinafter defined by the appended claims.

I claim as my invention:

1. A scraper of the character described comprising a substantially semicircular plate forming the scraper bottom, a substantially semicylindrical wall joined to and rising from said bottom, said wall being disposed at approximately a right angle to the plane of the bottom and rising from the arcuate edge thereof, the ends of said wall and the straight front edge of said bottom defining the open front of said scraper, said straight front edge of the bottom, the ends of the wall and the top edge of said wall forming the scraping edges and a crossbar extending between the end portions of the wall having downturned end portions secured to the inner side of the wall near to but spaced from the ends of the wall, said crossbar being located adjacent the upper edge of the wall and being spaced from its end and top edges to form a handle or a handle part in combination with either the bottom or wall.

2. A combination scoop and scraper of substantially semicircular shape including a substantially flat semicircular bottom and a semicylindrical wall having a longitudinal bottom edge joined to and rising from said bottom, said bottom having a straight front edge forming a scraping edge having ends disposed adjacent the ends of the wall, and the ends and top edge of said wall constituting scraping edges, said top edge constituting a semicircular scraping edge all portions of which are disposed coplanar and in a plane parallel to the plane of the bottom.

References Cited in the file of this patent

UNITED STATES PATENTS

| | | |
|---|---|---|
| 293,261 | Matcham | Feb. 12, 1884 |
| 1,390,168 | Seelig | Sept. 6, 1921 |
| 1,883,726 | Warren | Oct. 18, 1932 |
| 2,283,669 | Edgren | May 19, 1942 |
| 2,649,604 | Hess | Aug. 25, 1953 |